(12) United States Patent
Kuroba et al.

(10) Patent No.: US 6,904,010 B1
(45) Date of Patent: Jun. 7, 2005

(54) METHOD OF WRITING SERVO TRACKS FOR DISK FILE APPARATUS USING WRITE START OR STOP SECTORS

(75) Inventors: Yasumasa Kuroba, Kawasaki (JP); Tomoyoshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/512,500

(22) Filed: Feb. 24, 2000

(30) Foreign Application Priority Data

Jun. 30, 1999 (JP) .......................................... 11-186127

(51) Int. Cl.[7] .......................... G11B 19/20; G11B 5/596
(52) U.S. Cl. ............... 369/53.3; 369/53.34; 369/53.14; 369/47.3; 360/77.4
(58) Field of Search ............................ 369/53.3, 53.18, 369/53.34, 53.14, 47.3; 360/77.04, 51, 78.04, 75

(56) References Cited

U.S. PATENT DOCUMENTS

| | | | | |
|---|---|---|---|---|
| 5,903,408 A | * | 5/1999 | Omi ......................... | 360/73.03 |
| 5,936,787 A | * | 8/1999 | Ohmi ....................... | 360/73.03 |
| 5,995,318 A | * | 11/1999 | Hasegawa et al. ........ | 360/78.14 |
| 6,064,541 A | * | 5/2000 | Sasamoto et al. ......... | 360/77.05 |
| 6,111,714 A | * | 8/2000 | Ueda et al. ................ | 360/60 |
| 6,128,153 A | * | 10/2000 | Hasegawa et al. ........ | 360/77.08 |
| 6,324,132 B1 | * | 11/2001 | Kagami et al. ............ | 369/32 |
| 6,404,576 B1 | * | 6/2002 | Hamaguchi et al. ...... | 360/48 |
| 6,519,107 B1 | * | 2/2003 | Ehrlich et al. ............ | 360/77.08 |

FOREIGN PATENT DOCUMENTS

| | | |
|---|---|---|
| JP | 1048276 | 2/1989 |
| JP | 5303852 | 11/1993 |
| JP | 8124336 | 5/1996 |
| JP | 10106192 | 4/1998 |

* cited by examiner

*Primary Examiner*—Gautam R. Patel
(74) *Attorney, Agent, or Firm*—Greer, Burns & Crain, Ltd.

(57) ABSTRACT

A method of STW (servo track write) for improving the quality of the servo tracks by suppressing the misalignment of the write start position caused by the asynchronous continuous vibration of a disk drive is disclosed. The disk drive includes a spindle motor, a disk medium, a write/read head and a head moving mechanism for carrying out the sector servo operation. The STW method comprises the steps of detecting the continuous vibration asynchronous with the rotational frequency of the spindle motor, detecting the phase of the asynchronous continuous vibration detected, determining the write start sector of each servo track based on the detected phase of the asynchronous continuous vibration, determining the write start time of each servo track in accordance with the clock signal, and moving the head onto the servo track where the head positioning information is written, by the head moving mechanism and writing the information in the servo track based on the write start time.

6 Claims, 13 Drawing Sheets

PRIOR ART
Fig.2A
PRIOR ART
Fig.2B
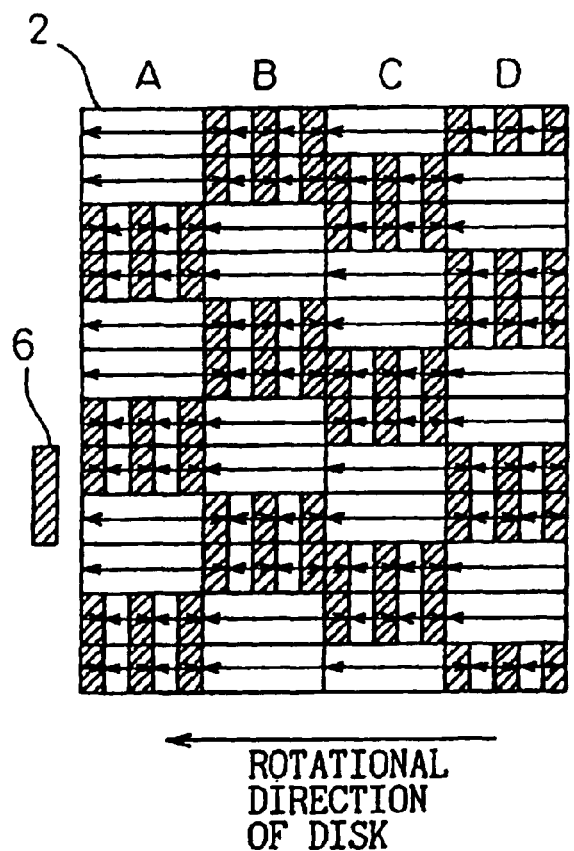
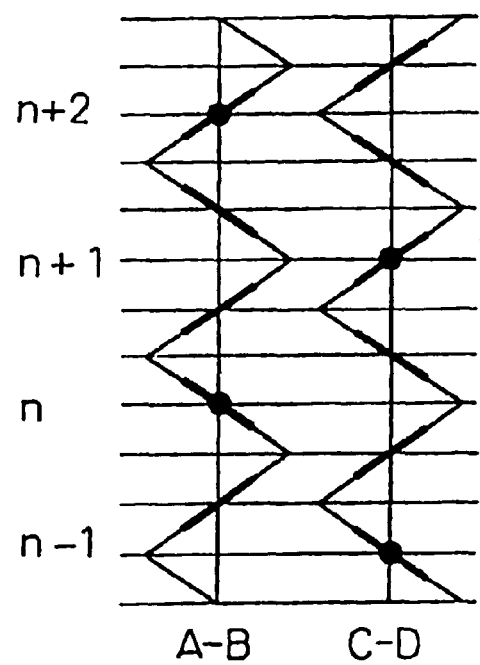

o START OF WRITING   • END OF WRITING

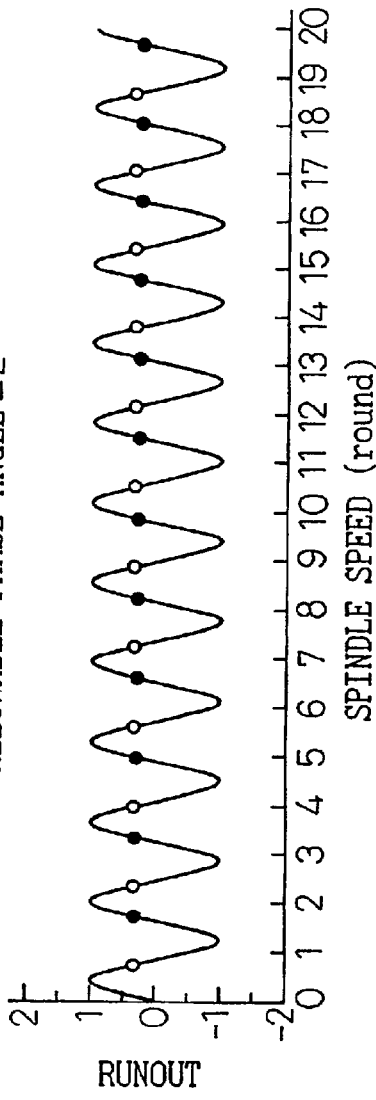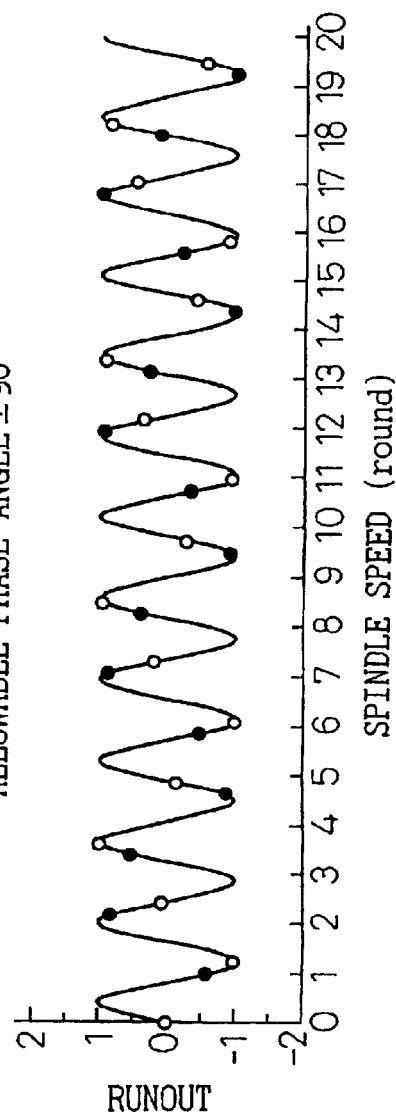

METHOD OF WRITING SERVO TRACKS FOR DISK FILE APPARATUS USING WRITE START OR STOP SECTORS

BACKGROUND OF THE INVENTION

1. Field of the Invention

The present invention relates to a method of writing servo tracks for a disk file apparatus or, in particular, to a method of writing servo tracks for a disk file apparatus such as a magnetic disk unit used as an external recording apparatus for computers, in which the quality of the servo tracks formed on the disk medium can be improved.

2. Description of the Related Art

In recent years, disk file apparatuses such as a magnetic disk unit and an optical disk unit have been used as an external storage unit for computers. In such a disk file apparatus, the storage capacity of the disk medium is increasing year by year. In the case where the size of the disk medium is fixed, therefore, the increased storage capacity makes it necessary to increase the TPI (tracks per inch) by narrowing the pitch of the recording tracks on the disk medium.

In a disk file apparatus such as a magnetic disk unit, on the other hand, the recording tracks formed on the disk medium are concentric about the rotational center of the disk. Each recording track is formed by each head of the disk unit by writing a servo pattern over the entire surface concentrically after the disk medium is assembled in the disk unit at the time of manufacture of the disk unit. Each recording track includes a servo zone having written therein servo information in advance and a data zone for recording data. The servo information is used for detecting a deviation between the center of the head and the center line of the recording track, and is written offset to the recording track. The operation for writing the servo pattern including the servo information is called servo track writing and, in the description that follows, the operation for writing the servo pattern will sometimes be referred to as the SYW.

In the STW for the conventional disk drive, first, a reference signal providing a time reference for writing a servo track is written in a portion other than the recording track on the disk medium by a fixed head (normally called a clock head, a reference head, etc.) loaded from outside the disk drive (which is also called DE, for disk enclosure). This reference signal contains a burst signal of a predetermined frequency and an index signal indicating a reference position. The servo tracks on the disk medium are written with the head in the DE in synchronism with the reference signal.

When performing the STW operation using the head in the DE, the head is moved on the disk medium by being pushed with a push pin of a drive unit (servo track writer) external to the DE. In the case where the moving accuracy of the push pin is low, therefore, the problem of a deteriorated write quality (STW quality) of the servo track arises. Another probable cause of deterioration of the STW quality is the continuous vibration, asynchronous with the rotational frequency of the spindle motor, due to the bearing of the spindle motor for rotating the disk medium. Therefore, an improvement in the STW quality, in view of the asynchronous continuous vibration, is desired.

SUMMARY OF THE INVENTION

Accordingly, the object of the present invention is to provide a STW method for a disk file apparatus such as magnetic disk unit, in which the servo track quality can be improved by suppressing the step, i.e. the misalignment between the write start position and the write end position of the servo track which is caused by the continuous vibration asynchronous with the spindle rotation.

In order to achieve the object described above, according to a first aspect of the invention, there is provided a method of writing a servo track of a disk file apparatus comprising at least one disk medium rotated by a spindle motor, a head for writing and reading data in and from the disk medium, and a head moving mechanism, wherein recording tracks, each divided into a plurality of sectors, are formed concentrically on the recording surface of the disk medium, and the head positioning information is written in the track of each sector, the method comprising the steps of detecting the continuous vibration asynchronous with the rotational frequency of the spindle motor, detecting the phase of the detected asynchronous continuous vibration, determining the write start sector or the write end sector or the write start time or the write end time of each servo track based on the detected phase of the asynchronous continuous vibration, and moving the head by the head moving mechanism onto the radius position for writing the head positioning information, and writing the aforementioned information based on the write start sector or the write end sector.

The method according to the first aspect of the invention can further comprise the steps of detecting the rotational frequency of the spindle motor, writing head positioning information for a predetermined number of tracks on the disk medium by the normal STW method, reading, with the same head, the predetermined number of tracks having the head positioning information written therein and detecting the phase of the head position signal output, and measuring the phase difference between the head position signal output and the phase of the asynchronous continuous vibration. Then, in the step of determining a write start sector or a write end sector of each servo track, the position $[(1-fc/fr) \times 180]°$ behind the phase of the peak amplitude of the asynchronous continuous vibration can be set as a write start position of the servo track in the case where fc<fr, and the position $[(fc/fr-1) \times 180]°$ ahead can be set as a write start position of the servo track in the case where fc>fr, where fc is the frequency of the asynchronous continuous vibration and fr the rotational frequency of the spindle motor.

Also, the method according to the first aspect of the invention can further comprise the steps of detecting the rotational frequency of a spindle motor, writing the head positioning information for a predetermined number of tracks in advance on a disk medium by the conventional STW method, and reading the predetermined number of the tracks having head positioning information written therein, with the same head. Then, the step of detecting the continuous vibration asynchronous with the rotational frequency of the spindle motor can include the substep of detecting the asynchronous continuous vibration by detecting the phase of the head position signal. Also, in the step of determining a write start sector or a write end sector of each servo track, the position $[(1-fc/fr) \times 180]°$ behind the phase of the peak amplitude of the asynchronous continuous vibration can be set as a write start position of the servo track in the case where fc<fr, and the position $[(fc/fr-1) \times 180]°$ ahead can be set as a write start position of the servo track in the case where fc>fr, where fc is the frequency of the asynchronous continuous vibration and fr the rotational frequency of the spindle motor. Further, the step of writing information in the servo track can include the substeps of forming a schedule for writing information in plural ones of all the recording tracks and writing the head positioning information in the plural servo tracks according to the particular schedule.

In the method according to the first aspect of the invention, the step of detecting the phase of the head position signal output can include the substeps of detecting the phase difference between the detected phase and the phase detected at the preceding time of forming a schedule and repeating the execution of the steps including and subsequent to the step of writing the head positioning information for a predetermined number of tracks in a disk medium by the normal STW method in the case where the phase difference exceeds a predetermined value.

Also, the method according to the first aspect of the invention can further comprise the steps of detecting the rotational frequency of the spindle motor and moving the reference head finely after writing the clock signal at the outermost peripheral portion, and the step of detecting the continuous vibration asynchronous with the rotational frequency of the spindle motor can include the substeps of observing the modulation of the clock signal detected from the reference head and detecting the phase of the asynchronous continuous vibration from the observed modulation. Also, in the step of determining a write start sector or a write end sector of each servo track, the position $[(1-fc/fr) \times 180]°$ behind the phase of the peak amplitude of the asynchronous continuous vibration can be set as a write start position of the servo track in the case where fc<fr, and the position $[(fc/fr-1) \times 180]°$ ahead can be set as a write start position of the servo track in the case where fc>fr, where fc is the frequency of the asynchronous continuous vibration and fr the rotational frequency of the spindle motor.

Further, the method according to the first aspect of the invention can comprise the steps of detecting the rotational frequency of the spindle motor, writing the head positioning information for at least one track, by a third head other than the first head and the head for writing the reference signal, at a place other than the zone for writing the reference signal and the zone for performing the STW of the disk medium, and reading the track having the head positioning information written therein, with the third head, and the step of detecting the continuous vibration asynchronous with the rotational frequency of the spindle motor includes the substep of detecting the asynchronous continuous vibration by detecting the phase of the head position signal read with the third head. Also, in the step of determining a write start sector or a write end sector of each servo track, the position $[(1-fc/fr) \times 180]°$ behind the phase of the peak amplitude of the asynchronous continuous vibration can be set as a write start position of the servo track in the case where fc<fr, and the position $[(fc/fr-1) \times 180]°$ ahead can be set as a write start position of the servo track in the case where fc>fr, where fc is the frequency of the asynchronous continuous vibration and fr the rotational frequency of the spindle motor.

According to a second aspect of the invention, there is provided a method of writing a servo track of a disk file apparatus comprising at least one disk medium rotated by a spindle motor, a head for writing and reading data in and from the disk medium, and a head moving mechanism, wherein recording tracks each divided into a plurality of sectors are formed concentrically on the recording surface of the disk medium, and the head positioning information is written in the track of each sector, the method comprising the steps of detecting the continuous vibration asynchronous with the rotational frequency of the spindle motor, detecting the phase and amplitude of the detected asynchronous continuous vibration, writing the head positioning information for a predetermined number of tracks in advance in such a manner as to satisfy the equation $n(i)=(n(i-1)+mfr/fc) \bmod m$ between adjacent servo tracks, where m is the number of servo sectors, fr the rotational frequency, fc the frequency of the asynchronous continuous vibration, n(i) the servo sector number where the ith servo track begins to be written, and mod the operator for producing the resolution of the remainder for the succeeding numerical value m, detecting the asynchronous continuous vibration while at the same time writing the head positioning information, detecting the phase of the head position signal by reading, with the same head, the predetermined number of tracks having the head positioning information written therein, calculating the phase difference between the head position signal thus obtained and the phase detection output of the asynchronous continuous vibration at the time of the write operation corresponding to the head position signal and thereby calculating the unnecessary head vibration amplitude attributable to the asynchronous continuous vibration at the time of writing the head positioning information from the particular phase difference, measuring the timing and amplitude for vibrating the head moving mechanism in such a manner as to suppress the unnecessary head vibration amplitude, and writing the head positioning information in the disk medium while vibrating the head moving mechanism based on the vibration timing and the vibration amplitude.

With the STW method for the disk file apparatus according to the invention, the continuous vibration asynchronous with the rotational frequency of the spindle motor is detected, and the STW operation is performed based on the resulting detection signal. Therefore, a radial step or misalignment hardly occurs between the write starting position and the write ending position at the time of STW, thereby improving the quality of the head positioning information written by the STW operation.

BRIEF DESCRIPTION OF THE DRAWINGS

The present invention will be more clearly understood from the description as set forth below with reference to the accompanying drawings, wherein:

FIG. 2A is a diagram for explaining an ordinary servo pattern;

FIG. 2B is a diagram showing the head output characteristic when reading the servo pattern of FIG. 2A;

FIG. 11A is a diagram for explaining the STW method according to a third embodiment of the invention;

FIG. 11B is a diagram for explaining the conventional STW method;

DESCRIPTION OF THE PREFERRED EMBODIMENTS

Before describing the preferred embodiments, an explanation will be given of the conventional method of STW for the disk file apparatus shown in FIGS. 1 to 5B.

Figure 1:
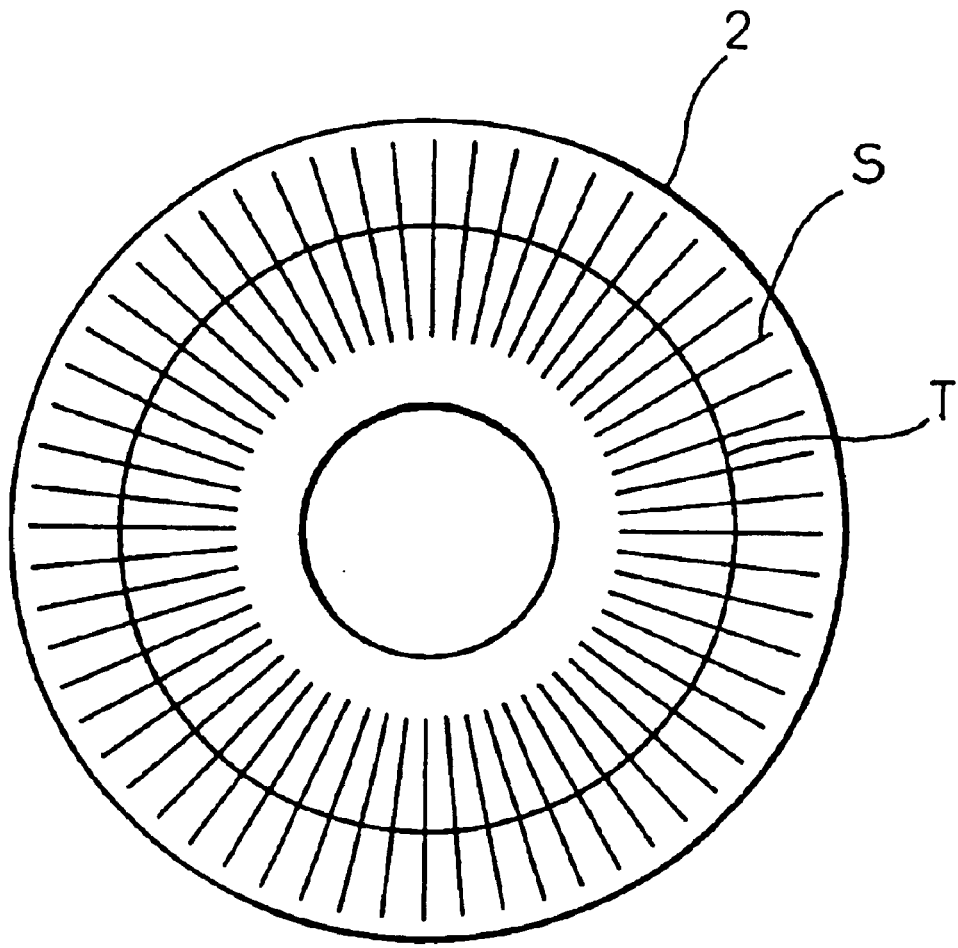
FIG. 1 is a diagram showing a model arrangement of a servo track and sectors on the conventional disk medium.

FIG. 1 shows a model arrangement of recording tracks and sectors S on a disk medium 2 of a magnetic disk unit. A multiplicity of the recording tracks T are arranged concentrically on the disk medium 2 but only one recording track T is shown in FIG. 1. Each track T is divided into a plurality of (60, for example) sectors S each having a servo zone at the head of the recording track T thereof. This servo zone has written therein a servo pattern signal including the information of the number of the sector S and the number of the recording track T.

FIG. 2A shows a servo pattern signal constituting an example of a two-phase servo pattern. This two-phase servo pattern is for demodulating the servo signal from the difference between the peaks of the four inverted magnetizations written displaced along the radius and the disk rotational direction. The reference numeral 6 in FIG. 2A indicates a head, and characters (n−1), n, (n+1), (n+2) designate the recording track numbers. Also, FIG. 2B shows an output waveform from the head 6 according to the two layers of servo patterns, in which A-B designates a waveform obtained from the section between A and B, and C-D the waveform obtained from the section between C and D in FIG. 2A.

In the STW operation, the servo pattern for one rotation is written in the disk medium 2 thereby to form a recording track T, after which the head 6 is moved along the diameter and set in position where the next servo pattern is to be written. In this way, the process of forming each recording track T by writing the head positioning information for one rotation of the disk medium 2 is repeated until the servo patterns are written over the entire surface of the disk medium 2. The servo pattern for forming each recording track T begins to be written at a specified sector or, in order to shorten the STW time, immediately after the complete movement of the head 6 in the prior art. In the process, however, at least the attenuation of the residual vibration of the push pin, etc. after head movement is taken into consideration. The operation of writing the servo pattern in the disk medium 2 will hereinafter be referred to simply as the servo track write operation.

Figure 3A:
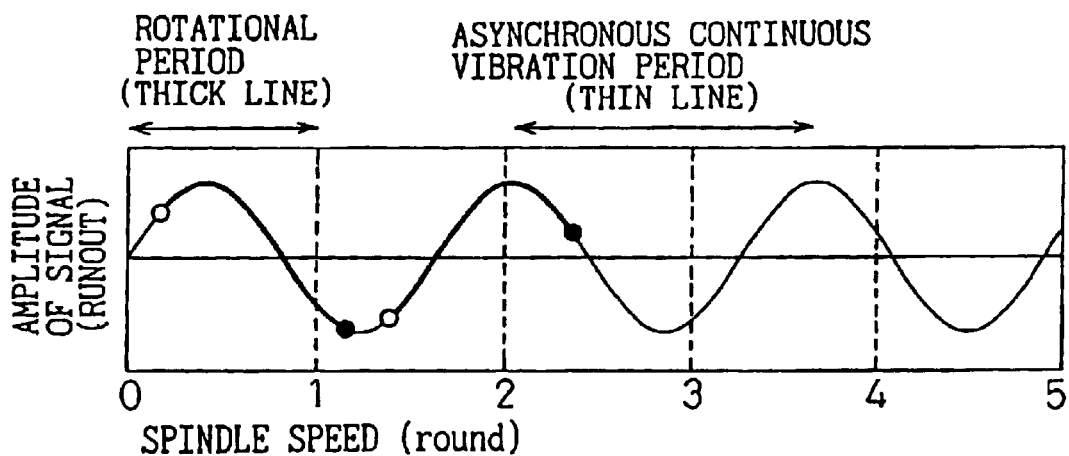
FIG. 3A is a diagram for explaining the conventional STW method.
Figure 3B:
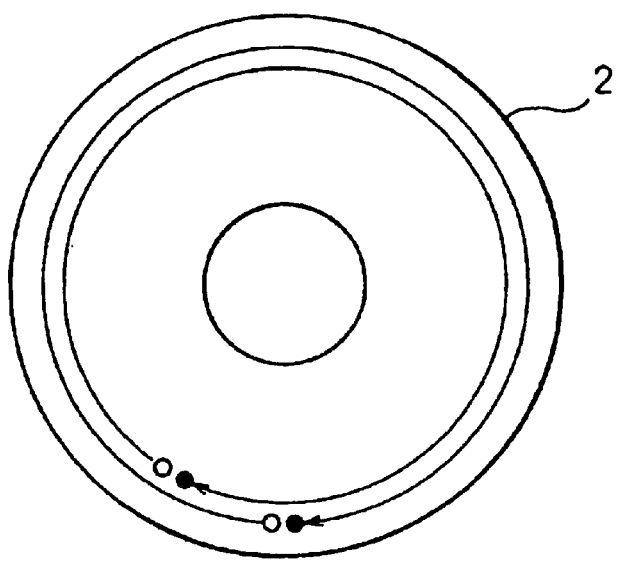
FIG. 3B is a diagram showing servo tracks on a disk medium.

FIGS. 3A, 3B show the manner in which the servo track is written in the disk medium according to the prior art. In FIGS. 3A, 3B, the white circle indicates the start of the write operation and the black circle the end of the write operation. Each time the disk medium 2 makes one rotation, the servo track is written as indicated by thick line.

In this STW operation, however, the head is desirably always located on the disk medium 2 without unnecessary vibration. The disk medium 2, however, is accompanied by the asynchronous continuous vibration out of phase with the rotational period of the disk medium 2, and therefore the problem is encountered of the deteriorated write quality (STW quality) of the servo track.

One probable cause of the adverse effect on the STW quality is a disturbance such as the inaccurate movement of the push pin used for moving the head, the flutter of the disk or a vibration (NRRO: non-repeatable runout, i.e. asynchronous vibration of spindle rotation) out of phase with the rotation of the spindle motor. These factors are observed as a signal fluctuation (runout) when demodulated as a position signal. The smaller the runout, the higher the STW quality, resulting in a higher head positioning accuracy.

A spindle motor using a rolling bearing (ball bearing, etc.), for example, develops a continuous vibration out of phase with the rotation of the spindle motor. The asynchronous continuous vibration is a vibration not synchronous with the rotational period of the spindle motor and is observed as a NRRO in the head positioning operation. The asynchronous continuous vibration of the spindle rotation has a substantially constant period during the rotation of the spindle motor, and continues even though the amplitude and phase undergo changes under some conditions.

With the asynchronous continuous vibration of the spindle rotation, the STW operation performed by repeating the write operation for a round of the servo track and the head movement in synchronism with the rotational frequency of the spindle motor, develops a diametrical displacement between the write starting point and the write ending point on a recording track, resulting in a misalignment.

Figure 4A:
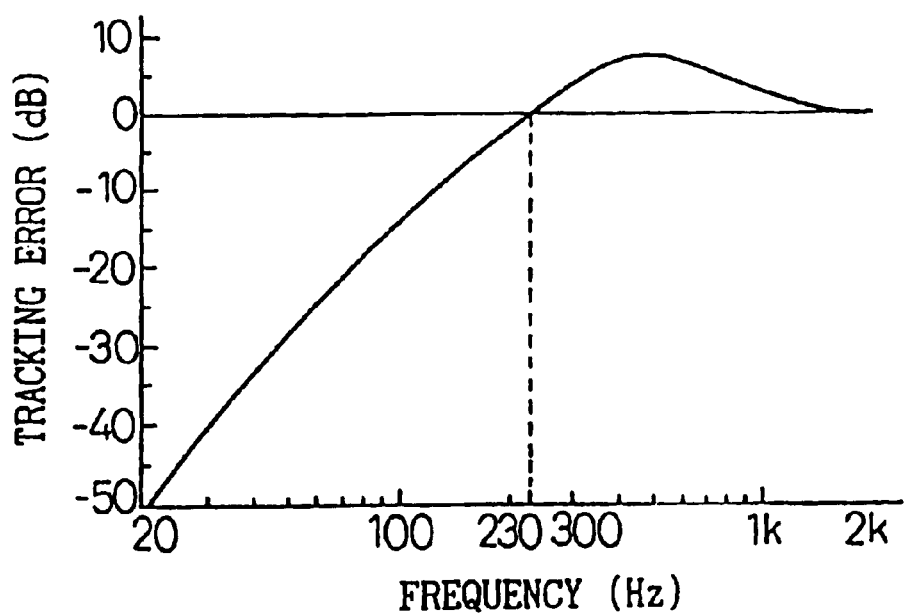
FIGS. 4A and 4B are characteristic diagrams showing the tracking characteristics of an actuator.
Figure 4B:
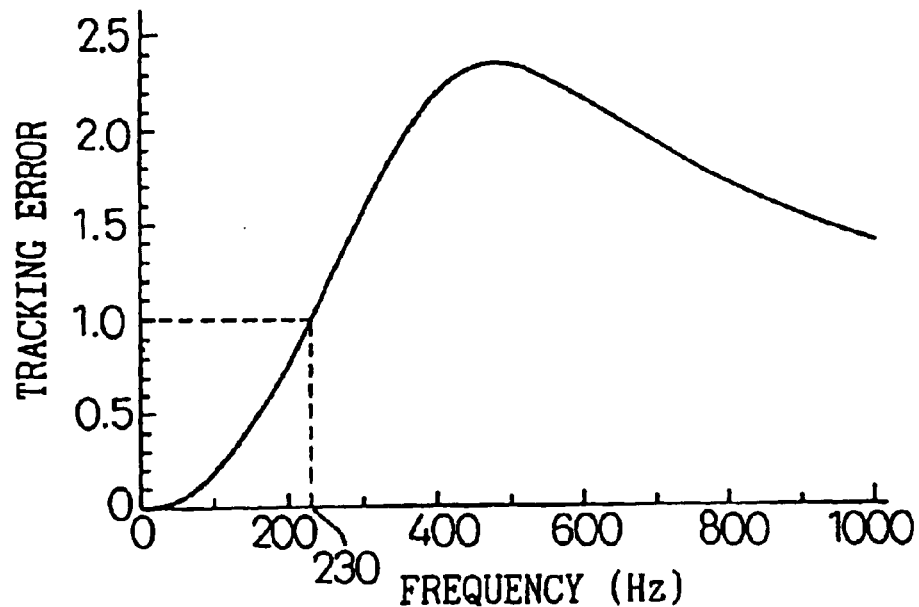

In the disk drive, data are written and read by the tracking of the servo track by the head under the closed loop control. An example of the tracking error characteristic of a conventional actuator is shown in FIGS. 4A, 4B. FIG. 4A is plotted with the ordinate showing tracking error in decibel (dB), while FIG. 4B is plotted with the ordinate showing tracking error in arbitrary scale. As seen from these drawings, the amplitude of the runout of the write operation is maintained at about 230 Hz, and the amplitude of vibration is enlarged for a higher frequency, while the amplitude of vibration can be compressed for a lower frequency. Thus, it is seen that the amplitude of the high frequency of about 230 Hz or more should be suppressed as far as possible.

Figure 5A:
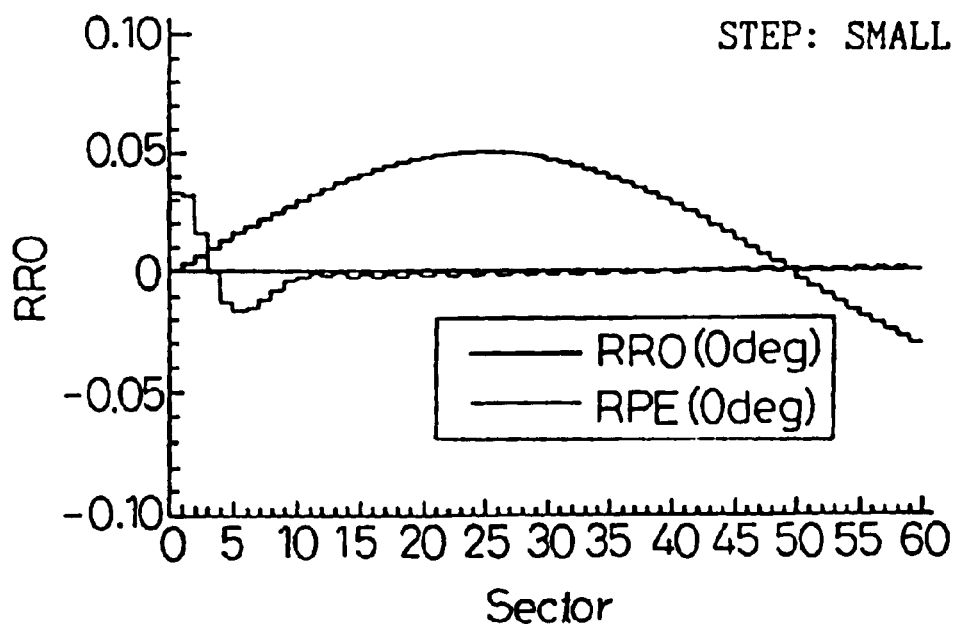
FIG. 5A is a characteristic diagram for explaining the behavioral difference of the head position signal when the misalignment of the synchronous runout of spindle rotation written by the STW operation is small.
Figure 5B:
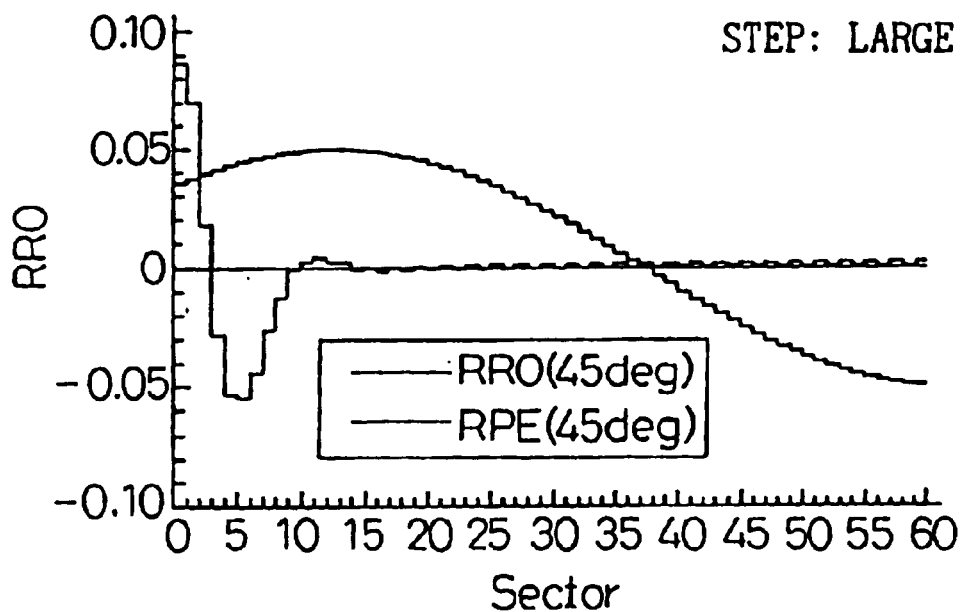
FIG. 5B is a characteristic diagram for explaining the behavioral difference of the head position signal when the misalignment of the synchronous runout of spindle rotation written by the STW operation is large.

FIGS. 5A, 5B show a comparison of the behavioral difference of the position signal (position error signal or PES) with the magnitude of the misalignment of the synchronous runout of spindle rotation, i.e. RRO (repeatable runout) written by the STW operation. Once the misalignment described above develops due to the asynchronous continuous vibration in writing the servo track, a high-frequency vibration develops in the demodulated position signal, resulting in an enlarged runout for a deteriorated accuracy. This has posed a problem especially in view of the fact that a higher track density requires an increased positioning accuracy, which in turn requires a higher STW quality.

In the current situation, an example of the continuous vibration component out of phase with the spindle rotation is a vibration attributable to the bearing. The orbiting vibration fc, which is considered to have the most influence and is caused by the ball bearing of the spindle motor, is expressed as $$fc=fr/2\times(1+d/D*\cos \alpha)$$

where d is the ball diameter of the ball bearing, D the pitch diameter, $\alpha$ the contact angle, and fr the rotational frequency of the spindle motor.

In view of this, according to this invention, there is provided a STW method, for a disk file apparatus such as a magnetic disk drive, in which the misalignment of the servo track between the write starting point and the write ending point caused by the continuous vibration component asynchronous with the spindle rotation is suppressed, thereby improving the quality of the servo track.

Now, embodiments of the present invention will be described in detail with reference to specific examples. Before describing embodiments of the invention specifically, the configuration of a servo track writer for performing the STW process will be explained.

Figure 6:
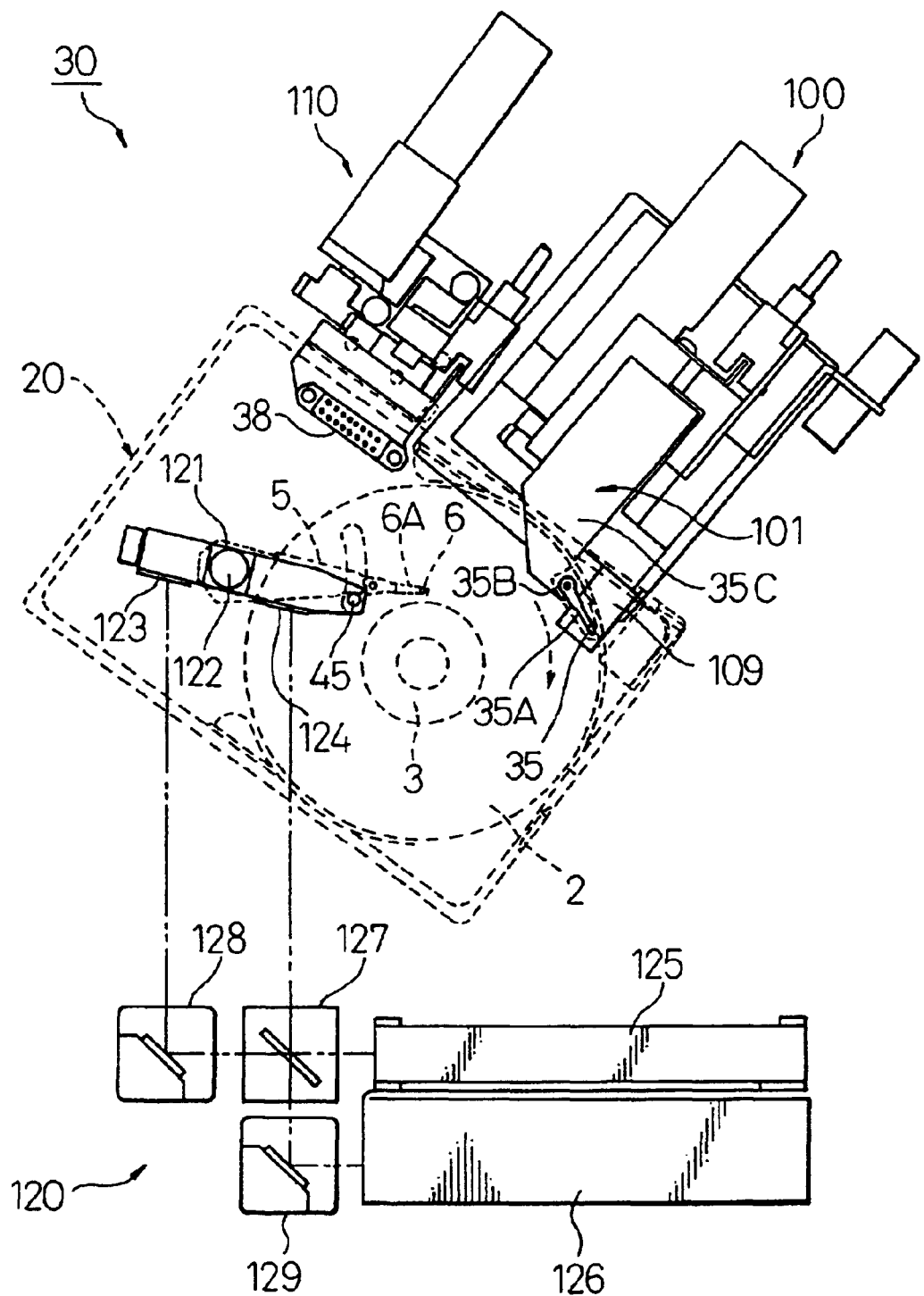
FIG. 6 is a plan view showing the essential parts of a servo track writer according to the invention.

FIG. 6 shows a configuration of a servo track writer 30 used for the STW method in the disk file apparatus according to the invention. The servo track writer 30 includes a drive mechanism 100 of a reference head 35 for writing a reference signal in a disk medium 2, a drive mechanism 110 of a connector contact pin 38 for electrically connecting to the disk file apparatus 20, and a drive mechanism 120 of a positioning pin (push pin) 45 of a carriage 5. In FIG. 6, the position of the disk file apparatus 20 mounted on the servo track writer 30 is indicated by dashed lines. In this disk file apparatus 20, reference numeral 2 designates a disk medium, numeral 3 a spindle motor for rotating the disk medium 2, and numeral 5 a carriage for holding the head 6 through an arm 6A.

The reference head 35 is mounted on a holding mechanism 101 including an arm 35A, a support 35B and a moving table 35C. The moving table 35C is adapted to rise and fall by the drive mechanism 100. The moving table 35C is configured of a thick plate, and the support 35B is protruded from an end thereof. The base of the arm 35A is mounted on the top of the support 35B, and the reference head 35 is mounted at the forward end of the arm 35A. The arm 35A is mounted replaceably on the support 35B.

The drive mechanism 120 of the positioning pin 45 in the servo track writer 30, as shown in FIG. 6, operates in such a manner that the carriage 5 of the disk file apparatus 20 is driven by the positioning pin 45. The positioning pin drive mechanism 120 includes a swing arm 121 having the positioning pin 45 protruded from an end thereof, a rotative shaft 122 of the swing arm, two reflectors 123, 124 arranged on the side of the rotative shaft 122, a laser beam source 125, a laser beam detector 126, a half mirror 127 for splitting the laser into two beams, and two reflectors 128, 129.

The laser beam emitted from the laser beam source 125 is split into two directions by the half mirror 127. One of the beams reaches the reflector 124 on the swing arm 121 directly, while the other beam is reflected on the reflector 128 and then reaches the reflector 123 on the swing arm 121. The laser beam reflected on the reflector 123 is reflected from the reflector 128 and the half mirror 127 and reaches the laser beam detector 126. The laser beam reflected from the reflector 124, on the other hand, is reflected from the reflector 129 and then reaches the laser beam detector 126.

The laser beam detector 126 detects the rotational angle of the carriage 5 of the disk file apparatus 20 according to the incidence condition of the laser beam reflected from the reflectors 123, 124. When changing the rotational angle of the carriage 5 of the disk file apparatus 20, a control signal is output to the positioning pin drive mechanism 120 so that the carriage 5 is pushed by the positioning pin 45 for changing the rotational angle.

In the servo track writer 30 having the configuration described above, a servo track is written on the disk medium 2 by the head 6. At the same time, the clock signal is written on the outermost peripheral portion of the disk medium 2 by the reference head 35. The recording tracks are formed by writing a servo pattern on the disk medium 2 concentrically with respect to the rotative shaft of the spindle motor 3.

Figure 7A:
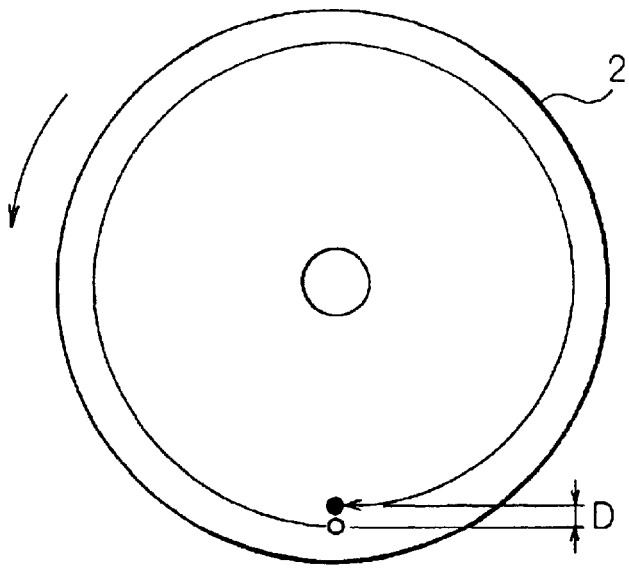
FIG. 7A is a diagram for explaining the misalignment between the write starting point and the write ending point of the servo track at the time of STW operation.

If it is supposed that, as shown in FIG. 7A, the write operation of the servo track is started from the position indicated by white circle on the disk medium 2 by the head and a round of the servo track is written, the head, as long as it is located on a concentric circle of the disk medium 2 or controlled to move following the eccentric rotation of the disk medium 2, should return to the write starting position at the time point when the servo track has been completely written. In the presence of a continuous vibration of the spindle asynchronous with the rotational period of the disk medium 2 as described above, however, the head returns to the position indicated by the black circle due to the asynchronous continuous vibration after writing a round of the servo track on the disk medium 2, thus causing a misalignment D with the write starting point indicated by white circle.

Figure 7B:
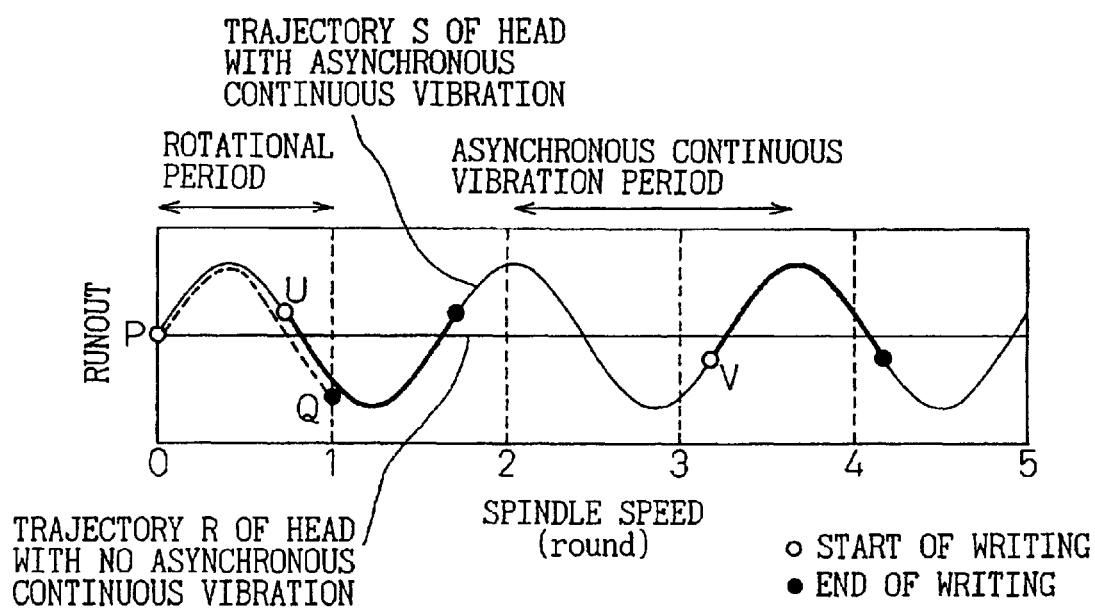
FIG. 7B is a characteristic diagram for explaining the conventional STW method compared with the STW method according to the invention in the presence of the asynchronous continuous vibration.

FIG. 7B shows the variation (runout) of the displacement of the head from the recording track in the case where the asynchronous continuous vibration is applied to the rotational period of the disk medium 2 in rotation. If it is supposed that, as seen from this drawing, the write operation of the servo track is started from the point P where the trajectory S of the head with the asynchronous continuous vibration coincides with the trajectory R of the head with no asynchronous continuous vibration, and a round of the servo track is written in the disk medium 2 as shown by dashed line, then, the position Q (a point on the head trajectory S with the asynchronous continuous vibration) is displaced from the head trajectory R with no asynchronous continuous vibration, resulting in a misalignment as shown in FIG. 7A.

In order to eliminate this misalignment after a round of write operation of the servo track, as shown by two examples of the write operation in FIG. 7B, the displacement of the head trajectory S from the head trajectory R with no asynchronous continuous vibration at the time point indicated by white circle when the servo track begins to be written is rendered to coincide with the displacement of the head trajectory S from the head trajectory R at the time point indicated by black circle when the servo track write operation ends.

Now, an explanation will be given, in more detail, on: the assumption that the continuous vibration asynchronous with the rotation of the spindle motor described above is caused by the bearing of the spindle motor. Let fr be the rotational frequency of the spindle motor at the time of STW, fc be the corresponding bearing frequency and $\sin(2\pi fct)$ be the vibration (runout) due to the bearing vibration at time point t. Then, when the write operation is started at time point t, the time after a round of write operation is given as $t+1/fr$. Thus, the misalignment at the time of starting (ending) the write operation is given below (amplitude pp: 2A).

$$A \{\sin(2\pi fct + 2\pi fc/fr) - \sin(2\pi fct)\} = 2A \sin(\pi fc/fr)\cos(\pi fc/fr + 2\pi fct)$$

Thus, for reducing the misalignment, the write operation is started at the time when $\cos(\pi fc/fr + 2\pi fct) = 0$, i.e. at time point $t = (n-\frac{1}{2})/2fc - fr/2$ derived from the relation $(n-\frac{1}{2}) = fc/fr + 2fct$, where n is assumed to be an integer. In other words, it is seen that a proper time point arrives at periods of $\frac{1}{2}fc$ (frequency=2fc).

As a result, it is recommended that the servo track begins to be written in synchronism with the bearing frequency fc or the rotational frequency 2fc. For assuring synchronization with the bearing frequency fc or the rotational frequency 2fc, the STW is executed while observing the frequency of the bearing of the spindle motor.

If the frequency of the bearing of the spindle motor is merely synchronized with the time of starting the servo track write operation, however, it is unknown whether the synchronized time is the "best" time or the "worst" time. The best time is $\Delta t = (1/fc - 1/fr)/2$ delayed behind the time of the peak runout amplitude of the bearing frequency fc as viewed in the head. In terms of phase, this delay is given as $(1 - fc/fr) \times 180°$. This phase relation assumes that $fc < fr$. In the case where $fc > fr$, on the other hand, the delay becomes negative, i.e. a lead of $(fc/fr - 1) \times 180°$.

It follows, therefore, that the misalignment, i.e., the step can be minimized by starting the servo track write operation at the time $(1/fc - 1/fr)/2$ delayed behind the time of the peak runout amplitude of the bearing frequency fc which is an asynchronous continuous vibration. This position is indicated by the write starting point U on the left side of FIG. 7B. After that, the head is moved and starts to write the adjacent track at the position $(1/fc - 1/fr)/2$ delayed from the time of the peak runout amplitude of the bearing frequency arriving after moving the head. This time is indicated by the write starting point V on the right side of FIG. 7B. Thus, once the synchronism with the bearing frequency can be assured, the time of starting the servo track can be determined by taking the head move time into account.

If it is assumed, for example, that the asynchronous continuous vibration frequency fc is the orbital frequency of the bearing at 42 Hz while the rotational frequency fr of the spindle motor is 70 Hz and if the write operation is started at a phase 72° delayed from the phase of the peak orbital vibration, the misalignment between the write start and write end of the servo track suppressed most.

The runout cannot be measured at the time of STW using the head. According to this invention, therefore, the STW operation is performed in advance for several servo tracks and the servo tracks thus written are read by the head to demodulate the position signal. Thus, the phase difference is detected with respect to the asynchronous continuous vibration that can be observed by a device other than the head. Then, the phase at which the servo track begins to be written is determined taking this phase difference and the delay of $(1 - fc/fr) \times 180°$ into account. In this case, whether the phase of the asynchronous continuous vibration varies or not is checked by periodically confirming the write signal, and in the case of a variation, the phase at which the servo track begins to be written must be corrected.

In the case where no vibration detecting means other than the head is used as a means for detecting the continuous vibration asynchronous with the spindle motor rotation, the position signal is demodulated with the head from several servo tracks already written, and based on the observed asynchronous continuous vibration, the write starting time is identified with respect to the STW standard time thereby to form a schedule. Thus, the STW can be performed. Also in such a case, the periodic confirmation and correction of the write signal according to the schedule may be required.

An embodiment for realizing the STW method of a disk file apparatus according to the invention described above will be specifically described below. First, an embodiment will be explained in which a detecting means other than the head is used as a means for detecting the continuous vibration asynchronous with the spindle motor rotation, and then an explanation will be given of an embodiment including no means other than the head for detecting the asynchronous continuous vibration.

[First Embodiment]

The first embodiment uses an accelerometer as a means for detecting the continuous vibration asynchronous with the rotational frequency of the spindle motor. A configuration of an apparatus for realizing the method according to the first embodiment is shown in FIG. 8.

Figure 8:
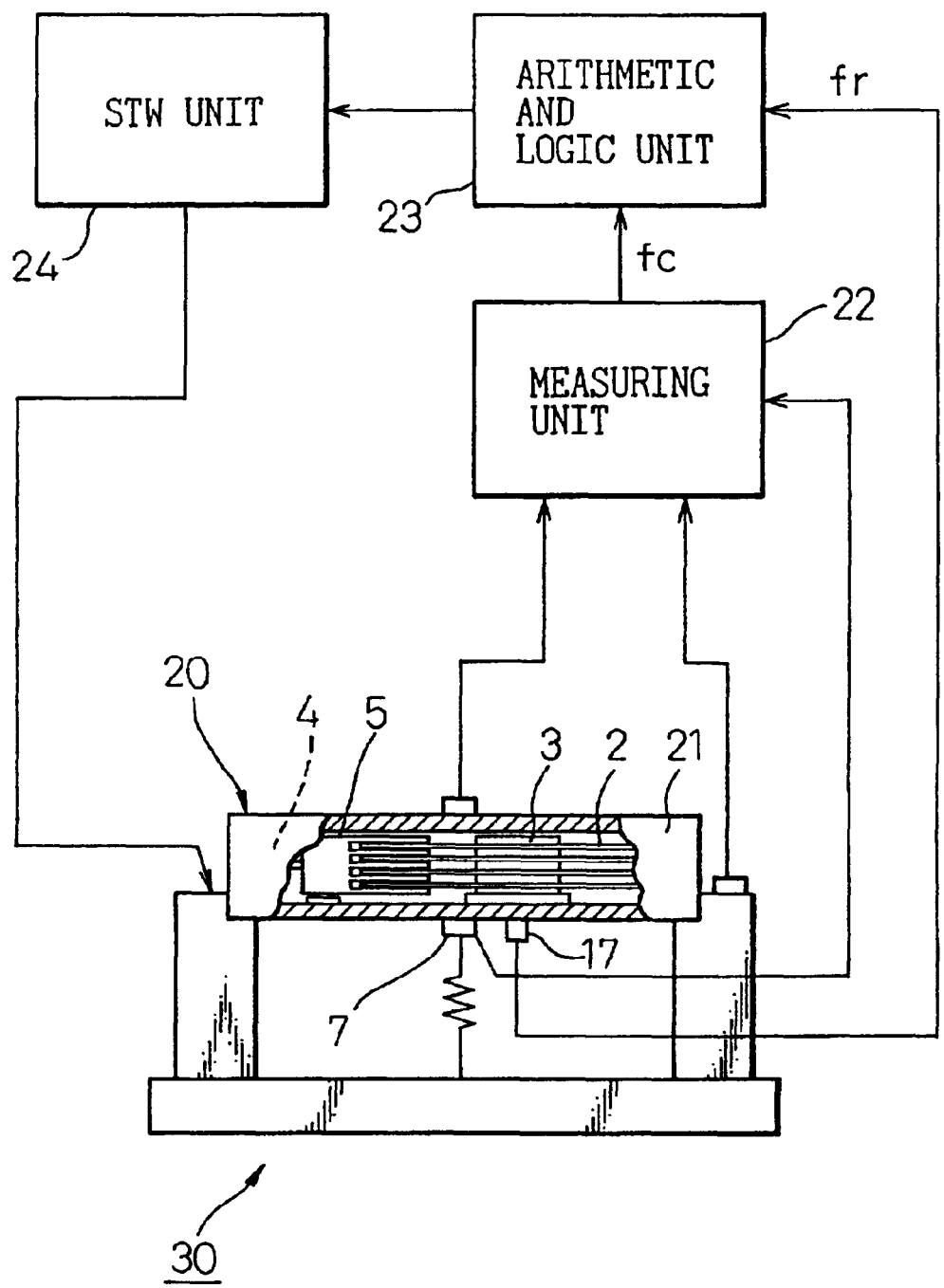
FIG. 8 is a diagram showing a configuration of an apparatus used for the STW method in a disk file apparatus according to the first embodiment of the invention.

In FIG. 8, numeral 20 designates a disk file apparatus mounted on the servo track writer 30 described with reference to FIG. 6. A housing 21 has arranged therein a disk medium 2 rotated by the spindle motor 3, a carriage 5 having a head and a VCM 4 for driving the carriage 5. According to the first embodiment, an accelerometer 7 is mounted on the housing 21 of the disk file apparatus 20 or the fixing jig of the disk file apparatus 20 of the servo track writer 30. The accelerometer meter 7 can be mounted by pressing it against the housing with a spring or by attaching it with adhesive such as wax. In some cases, it is possible to use the output of the accelerometer attached on the carriage or the flexible circuit board built in the disk file apparatus and used at the time of operation after being purchased on the market. The accelerometer 7 can be mounted at least in one position for detecting the acceleration output at the time of rotation of the spindle motor 3, and the detection output is input to the measuring unit 22.

In the measuring unit 22, the asynchronous continuous vibration fc out of phase with the rotation of the spindle motor 3 generated in the disk file apparatus 20 is detected based on the detection output from the accelerometers 7 installed at a plurality of points. The asynchronous continuous vibration fc is input from the measuring unit 22 to an arithmetic and logic unit 23. Also, the housing 21 of the disk file apparatus 20 has a rotational frequency sensor 17 for detecting the rotational frequency fr of the spindle motor 3, and the output of this rotational sensor 17 is also input to the arithmetic and logic unit 23.

The arithmetic and logic unit 23 determines the write timing of the servo track based on the asynchronous continuous vibration frequency fc and the rotational frequency fr of the spindle motor 3 input thereto, and transmits the result to the STW unit 24. The STW unit 24, in compliance with the instruction on the servo track write timing from the arithmetic and logic unit 23, outputs a signal to the servo track writer 30 for performing the STW. In the arithmetic and logic unit 23, the asynchronous continuous vibration frequency fc out of phase with the rotational frequency fr of the spindle motor is separated by a narrow-band pass filter (BPF) or the like and locked. Instead of using the BPF, the phase can be determined by the discrete Fourier transform (DFT) by digital sampling using an A/D converter.

In the case where the asynchronous continuous vibration is an orbital vibration or the like attributable to the rolling bearing of the spindle motor 3, the frequency is calculated from the specification of the roll bearing as described above. This facilitates the calculation even when there are plural vibrations to be measured.

Figure 9:
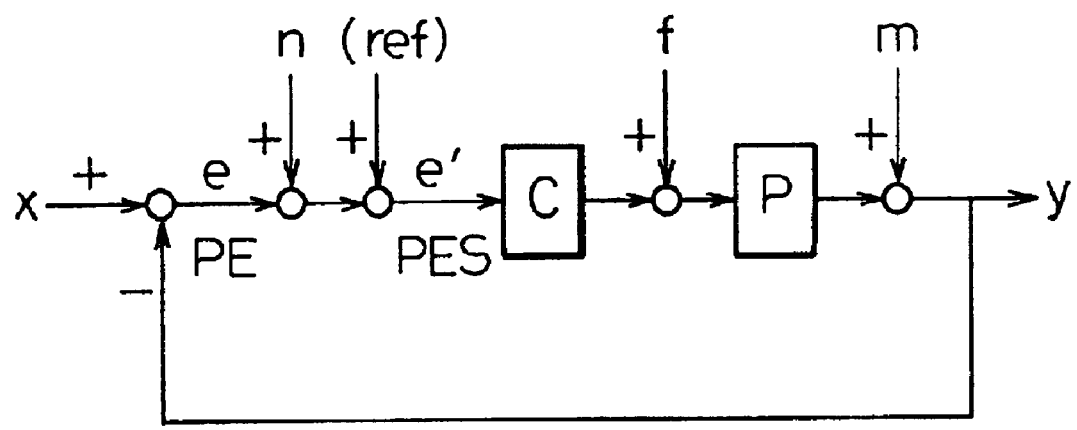
FIG. 9 is a block diagram for controlling the carriage of the disk file apparatus according to the invention.

FIG. 9 shows an example of a block diagram of the carriage control in the arithmetic and logic unit 23, but the functions thereof will not be described.

Now, an explanation will be given of the steps according to the STW method of the disk file apparatus in the first embodiment.

The first step in the STW method is to write the first several tracks by the normal STW process. The process is then stopped, and the position signal output from a track is observed by the head of the very disk file apparatus 20 that has written the servo tracks.

The output phase difference between the head position signal output and the output of the accelerometer 7 is measured. Then, the output phase of the accelerometer 7 with the asynchronous continuous vibration fc is detected while being locked to the asynchronous continuous vibration fc of the output of the accelerometer 7 in such a manner that the servo track write operation can be started from the head position based on the head position signal (1−fc/fr)× 180° behind the phase of the peak amplitude of the asynchronous continuous vibration frequency fc.

Then, with reference to the asynchronous continuous vibration fc of the output of the accelerometer 7, the servo tracks are written at the detected phase timing. As long as the phase is locked all the time to the asynchronous continuous vibration frequency fc, the phase is considered to be constantly corrected. Thus, in the case where the detection frequency accuracy of the bearing vibration is high, the constant locking is not required, but a periodic check of the phase of the asynchronous continuous vibration fc of the output of the accelerometer 7 is sufficient.

Now, the orbital vibration of the bearing will studied as the asynchronous continuous vibration fc. If the rotational frequency fr of the spindle motor is 70 Hz, and the asynchronous continuous vibration frequency fc is 43 Hz (orbital vibration of the bearing), for example, the cycle times are 14.3 msec and 23.3 msec, respectively. In the case where the STW is carried out in synchronism with the asynchronous continuous vibration fc, the phase for suppressing the misalignment at the write starting (ending) point arrives at intervals of a half period, and therefore the intervals are 11.7 msec. Since the write time for one round is 14.3 msec, however, the STW can be optimally carried out at intervals of one period of the asynchronous continuous vibration if the head move time after one round of write operation is not more than 9 msec. Under this condition, the head move time is set to 3 msec and the allowable phase range is widened to shorten the STW time as much as possible. Until ±40 degrees, the STW is scheduled to have intervals of one period. Nevertheless, the amplitude difference of the asynchronous continuous vibration between the write starting time and the write ending time at +40 degrees is undesirably not less than 50% of the amplitude (pp) of the asynchronous continuous vibration. For suppressing the amplitude difference to about ten percent of the asynchronous continuous vibration, the amplitude difference is properly required to be suppressed to not more than about ±5 degrees.

[Second Embodiment]

Figure 10A:
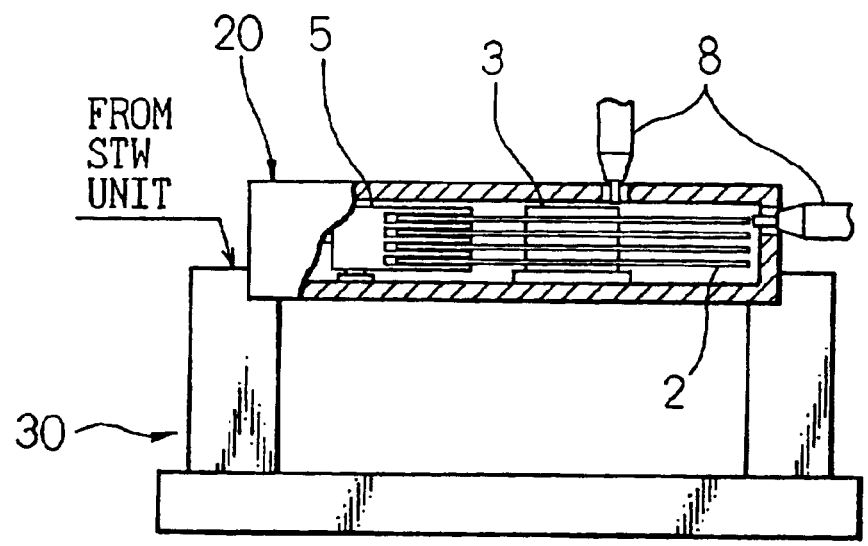
FIGS. 10A and 10B are diagrams for explaining the arrangement of a displacement gauge used for the STW operation of the disk file apparatus according to the second embodiment of the invention.
Figure 10B:
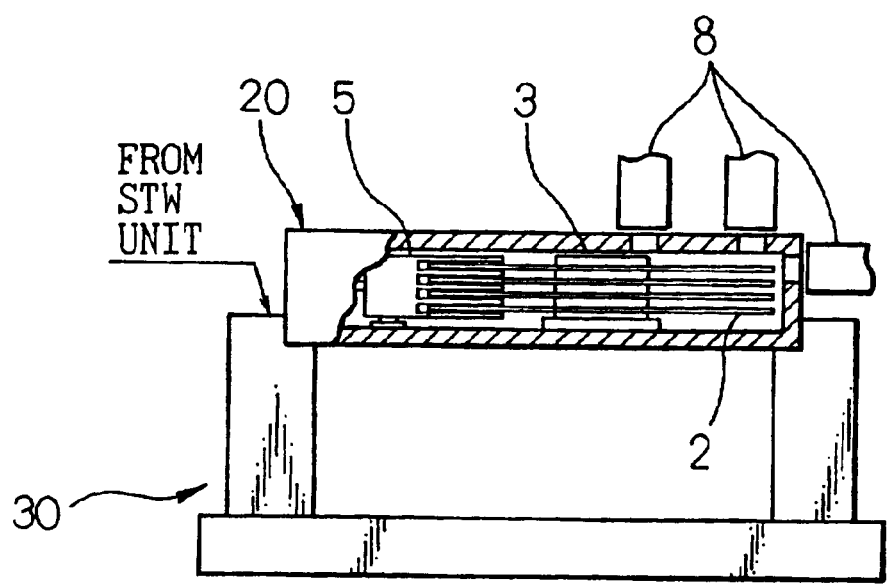

The second embodiment uses a displacement gauge as a means for detecting the continuous vibration out of phase with the rotational frequency of the spindle motor. The only difference in the second embodiment from the first embodiment is to use a displacement gauge in place of the accelerometer. Thus, the system configuration for realizing the second embodiment is different only in that the accelerometer 7 has been replaced by the displacement gauge 8. FIGS. 10A, 10B show two types of the displacement gauge 8 and the mounting position used in the second embodiment.

According to the second embodiment, the displacement gauge 8 is used as a means for detecting the asynchronous continuous vibration fc, which is detected from the output of the displacement gauge 8 as measured on the rotary portion (hub or the like) of the disk medium 2 or the spindle motor 3. The displacement gauge 8 is installed, as shown in FIG. 10A, at two positions (measuring points) in radial and axial directions of the disk medium 2 in the case where the bearing vibration is observed, like the orbital component thereof, in both radial and axial directions.

Another displacement gauge 8 can be mounted also on the positioning pin 45 of the servo writer 30 described with reference to FIG. 6. The advantage in this case is that the deviation of the head position in the rotational direction from the inner peripheral side to the outer peripheral side of the positioning pin 45 can be corrected.

Further, the measuring point is set at the end of the disk medium 2 or above the spindle motor (above the clamper) of the disk file apparatus when using an electrostatic capacitance type sensor or an eddy current sensor as the displacement gauge 8. The measurement is possible by opening a hole in the housing 2, or in the open state of the housing 21, for installing a probe.

Furthermore, when a laser displacement gauge or a LDV (laser Doppler vibrometer) is used, the measuring point is located on the upper surface or the lower surface of the disk medium of the disk file apparatus, as shown in FIG. 10B, or above the spindle motor (above the clamper) or at the spacer ring end between the disks. Although a hole must be formed in the housing of the disk file apparatus, an open structure is not required, and the measurement is possible with a translucent covering of a material such as glass.

In the STW method according to the second embodiment, which is similar to the first embodiment described above, the output of the displacement gauge 8 is used in place of the output of the accelerometer 7, and the asynchronous continuous vibration fc detected from the output of the displacement gauge 8 is locked by being separated with a BPF or the like in the arithmetic and logic unit 23 of FIG. 8, while detecting the write start position of the servo track.

The servo track is written at the detected phase with reference to the asynchronous continuous vibration fc of the output of the displacement gauge 8. As long as the asynchronous continuous vibration fc is kept locked, the phase is considered to be constantly corrected. In the case where the detection frequency accuracy of the bearing vibration is high, constant locking is not necessary, but a periodic phase check will do.

[Third Embodiment]

The first embodiment uses an accelerometer and the second embodiment uses a displacement gauge as a means for detecting the continuous vibration asynchronous with the rotational frequency of the spindle motor. According to the third embodiment, on the other hand, the head itself in the disk file apparatus is used for detecting the asynchronous continuous vibration. The STW signal is read with the same head that has effected STW, and the asynchronous continuous vibration is detected from the signal thus read. In the case where the rotational accuracy of the spindle motor is so high that the asynchronous continuous vibration occurs steadily, the constant observation of the asynchronous continuous vibration is not required, but the phase is checked once every several tracks in which the data are written, as in the first and second embodiments.

In a STW method, the head positioning signal is written in the first several tracks of the data zone in accordance with the STW steps in normal way. Then, the write operation is temporarily stopped, the head is positioned and the position signal output is read. The schedule for the possible write start time of each servo track is formed with the index signal as a reference time in such a manner as to start the write operation with a phase $(1-fc/fr) \times 180°$ behind the phase of the peak amplitude of the asynchronous continuous vibration fc contained in the position signal (fc<fr). In other words, the schedule is formed to carry out the STW for a plurality of predetermined servo tracks by setting the write start point of each head positioning signal in terms of the number of sectors.

The asynchronous continuous vibration frequency fc can be identified accurately by the discrete Fourier transform (DFT) or the maximum entropy method (MEM). Also, the phase of the asynchronous continuous vibration frequency fc is detected by DFT or the like. The accuracy of this measurement determines the writing accuracy. The reference time can be set with respect to the rotation of the spindle motor or with respect to the clock (sample) signal obtained in such a manner that the clock signal written by the reference head in advance on the outermost peripheral portion of the disk medium is reproduced by the same reference head. For improving the measurement accuracy, the phase of the asynchronous continuous vibration fc must be checked.

In the third embodiment in which the STW is carried out by forming a schedule of the possible write start time of the servo track as described above, as compared with the case requiring constant observation of the asynchronous continuous vibration fc using the accelerometer or the displacement gauge, the phase of the asynchronous continuous vibration must be checked and corrected more frequently. For example, the steps of checking and correcting the phase of the asynchronous continuous vibration fc at intervals of 200 rounds are shown below according to an embodiment.

(1) The STW for one track is carried out at an appropriate position.

(2) The head is positioned for demodulation, and the bearing frequency for 200 rounds is measured.

(3) The phase is determined for several rounds based on the frequency measurement.

(4) Based on this phase, a STW schedule is formed for 200 tracks.

(5) The STW is carried out for the 200 tracks.

(6) In the absence of an interruption midway, steps (3) to (5) are repeated.

(7) In the case where the phase measured in (3) above is considerably different from the phase expected at the previous time of forming the schedule, the STW is carried out again for the preceding 200 tracks.

An example of the schedule will be described. As explained in the first embodiment, when the rotational frequency fr of the spindle motor 3 is 70 Hz and the asynchronous continuous vibration fc is 43 Hz, the STW time for one round of servo track is 14.3 msec and the period of the asynchronous continuous vibration is 23.3 msec. Also in the third embodiment, the STW is carried out in synchronism with the asynchronous continuous vibration fc in order to eliminate the misalignment, i.e. the step between the write starting point and the write ending point of the servo track in a given recording track. In this case, the phase for suppressing the misalignment at the write start point arrives at half-cycle intervals of 11.7 msec of the asynchronous continuous vibration fc, and therefore the write time for one round is 14.3 msec. Thus, the STW for an adjacent servo track is started 9 msec (14.3 msec+9 msec=23.3 msec) after the end of the STW of a given servo track.

According to the third embodiment, the head travel time between recording tracks is 3.2 ms (<9 msec), and therefore the STW on the adjacent track is started 5.8 ms after moving the head to the particular adjacent track. Also, in order to suppress the amplitude difference to ten percent or less of the asynchronous continuous vibration amplitude (pp) as described in the first embodiment, the allowable phase angle is set to ±2 degrees in the third embodiment. The STW schedule for six recording tracks in this case is shown below. It is assumed that one recording track includes 60 sectors from sectors 00 to 59.

| Write starting round: | 00 | 02 | 04 | 05 | 07 | 08 | ... |
|---|---|---|---|---|---|---|---|
| Write starting sector: | 44 | 22 | 00 | 38 | 16 | 54 | ... |
| Write ending round: | 01 | 03 | 04 | 06 | 08 | 09 | ... |
| Write ending sector: | 43 | 21 | 59 | 37 | 15 | 53 | ... |

This is illustrated in FIG. 11A.

FIG. 11B shows the servo track write conditions by the conventional STW as compared with FIG. 11A. In the conventional method, once the STW for one servo track is complete, the head is moved to the adjacent track position and immediately the STW is carried out. Specifically, the STW for one round of the recording track is carried out in 14.3 msec, after which the head is moved to the adjacent recording track position in 3.2 msec, immediately followed by carrying out the STW. During the head travel time of 3.2 ms, 14 sectors pass under the head, and therefore the write sectors of the servo track in the conventional method are as follows. The allowable phase angle is assumed to be ±90°.

| Write starting round: | 00 | 01 | 02 | 03 | 04 | 06 | ... |
|---|---|---|---|---|---|---|---|
| Write starting sector: | 00 | 13 | 26 | 39 | 52 | 05 | ... |
| Write ending round: | 00 | 02 | 03 | 04 | 05 | 07 | ... |
| Write ending sector: | 59 | 12 | 25 | 38 | 51 | 04 | ... |

This conventional STW, as shown in FIG. 11B, is seen to involved an increased misalignment between the write start point and the write end point of the servo track.

[Fourth Embodiment]

In the fourth embodiment, the reference signal (clock signal) written by the reference head on the outermost peripheral portion of the disk medium is used as a means for detecting the asynchronous continuous vibration of the rotational frequency of the spindle motor. The reference signal is constant in frequency and amplitude. In the presence of an asynchronous continuous vibration at the time of writing this signal in the disk medium, the written reference signal also vibrates.

Figure 12A:
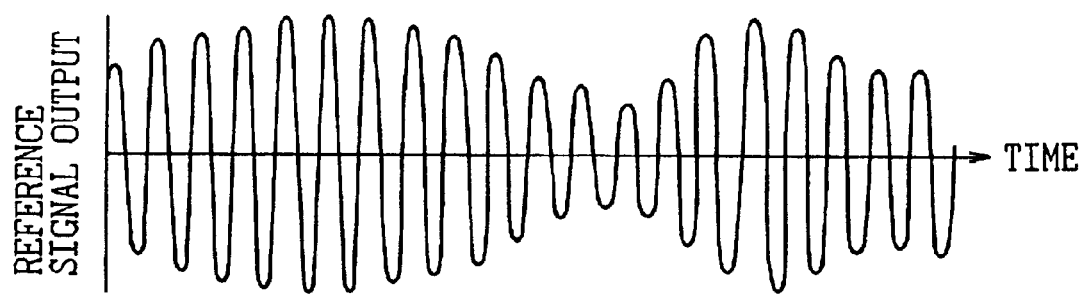
FIG. 12A is a waveform diagram showing a reference signal read from the head according to a fourth embodiment of the invention.

In view of this, according to the fourth embodiment, after the reference signal is written, the position of the reference head is moved finely a direction of radius of the disk medium so that the reference signal is read in offset position. Then the signal read from the reference head can be observed, as shown in FIG. 12A, with a modulated component of the asynchronous continuous vibration, i.e. with the amplitude increased or decreased from the time of writing the reference signal. The modulation observed can be considered a runout, and therefore the runout is calculated using the modulation thereby to detect the asynchronous continuous vibration component fc. In the case where the rotational accuracy of the spindle motor is high and the asynchronous continuous vibration is stable, as described above, it is sufficient to check the phase each time several tracks are written.

Figure 12B:
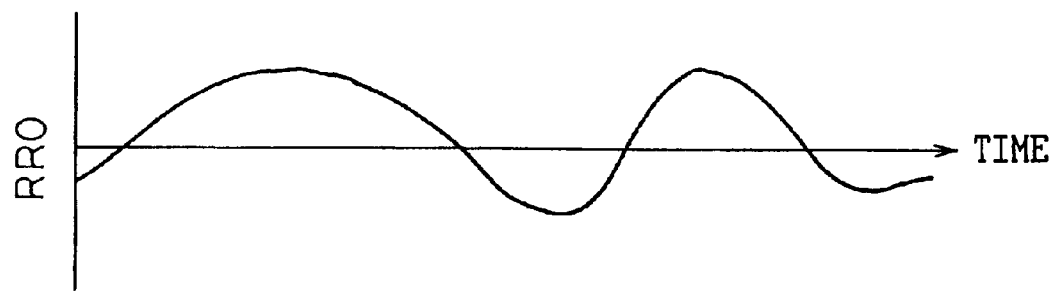
FIG. 12B is a waveform diagram showing the asynchronous continuous vibration calculated from the waveform diagram of FIG. 12A.

In one STW method, the clock signal for the reference head is written according to the conventional STW steps, after which the position of the reference head is offset diametrically, and this clock signal is read at this position thereby to observe the modulation. From this modulation, the runout is calculated and the asynchronous continuous vibration fc is separated and locked. A repeatable runout (RRO) as calculated is shown in FIG. 12B.

According to the fourth embodiment, a schedule of the write start time of each servo track is formed as in the third embodiment with the index signal (reference signal) as a reference time point in such a manner that the servo track write operation is started in a phase $(1-fc/fr) \times 180°$ behind the phase of the peak amplitude of the asynchronous continuous vibration fc (fc<fr). A method of carrying out the STW by forming this schedule is the same as in the third embodiment and will not be described.

[Fifth Embodiment]

In the fifth embodiment, a third type of head other than the reference head used in the embodiments described above and the head built in the disk file apparatus is used as a means for detecting the asynchronous continuous vibration. The fifth embodiment represents the case using a magnetic head as the third type of head.

Figure 13:
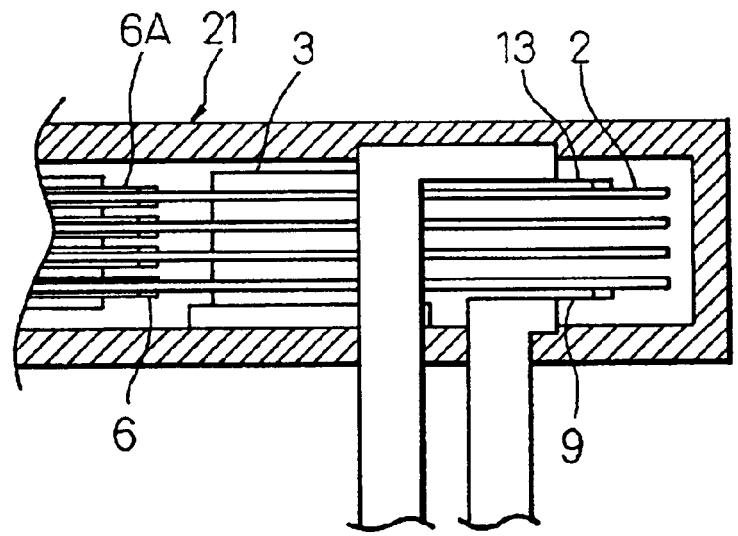
FIG. 13 is a diagram for explaining the arrangement of a third head used for the STW operation of the disk file apparatus according to a fifth embodiment of the invention.

As shown in FIG. 13, a third type of head 13 is arranged at a place where the signal can be written, other than the zone where the STW is carried out with the head 6 arranged at the forward end of the carriage arm 6A built in the housing 21 of the disk file apparatus and the zone where the reference head 9 is used for writing a clock signal at the outermost peripheral portion of the disk medium 2. The write signal due to the third type of head 13 can be a servo track signal or the like written by the STW. In such a case, while observing the asynchronous continuous vibration fc directly from the demodulation signal, the STW can be carried out in the same manner as in the first and second embodiments. Also, in the case where the burst signal like the reference signal is written, the STW can be carried out while observing the asynchronous continuous vibration fc by measuring the runout from the modulation as in the fourth embodiment.

[Sixth Embodiment]

According to the sixth embodiment, the third type of head 14 used in the fifth embodiment is replaced by an optical clock head 19.

Figure 14:
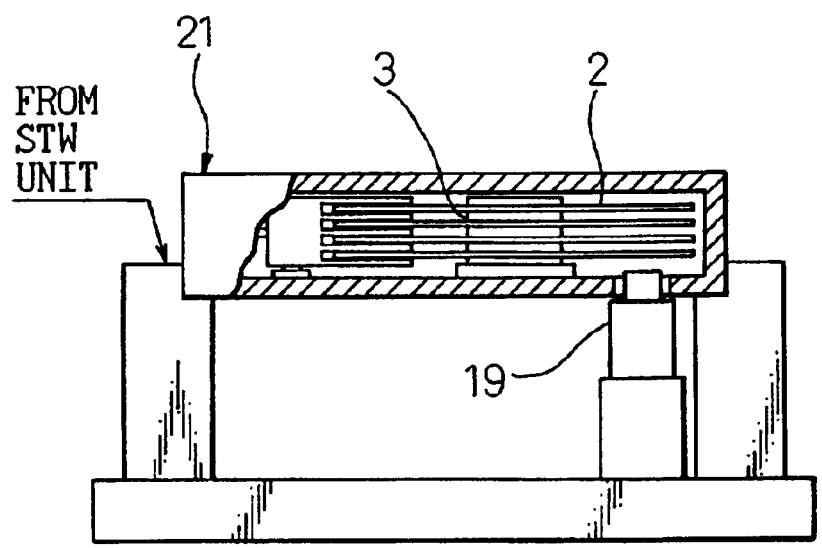
FIG. 14 is a diagram for explaining the arrangement of a third head used for the STW operation of the disk file apparatus according to a sixth embodiment of the invention.
Figure 3A:
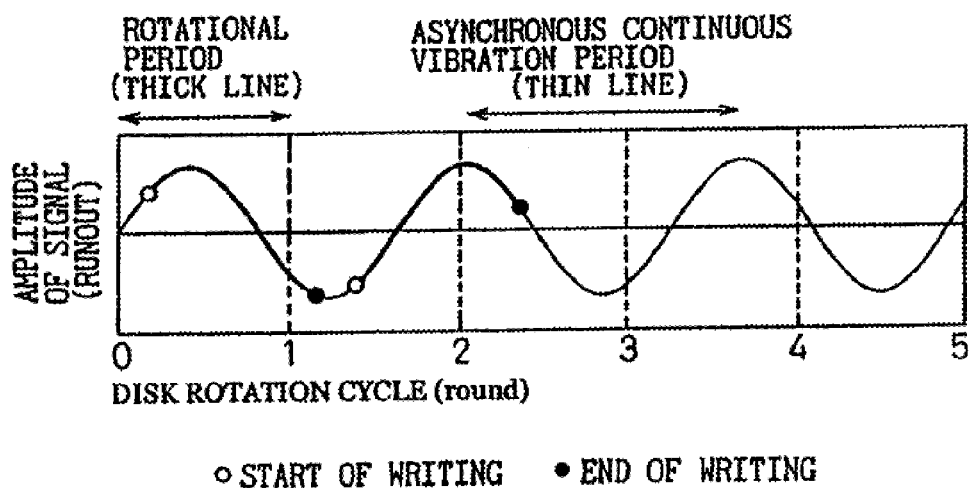
Figure 3B:
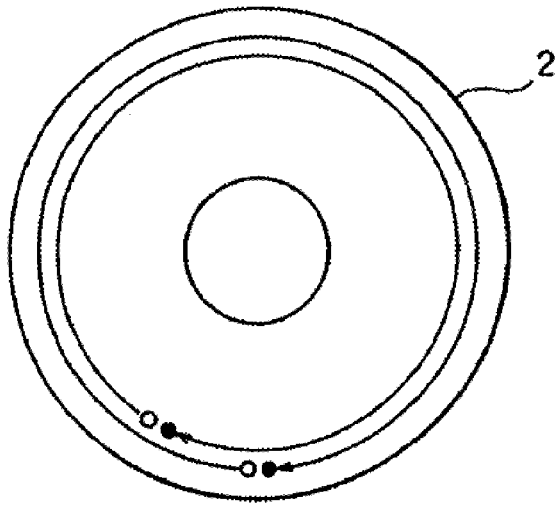
Figure 7A:
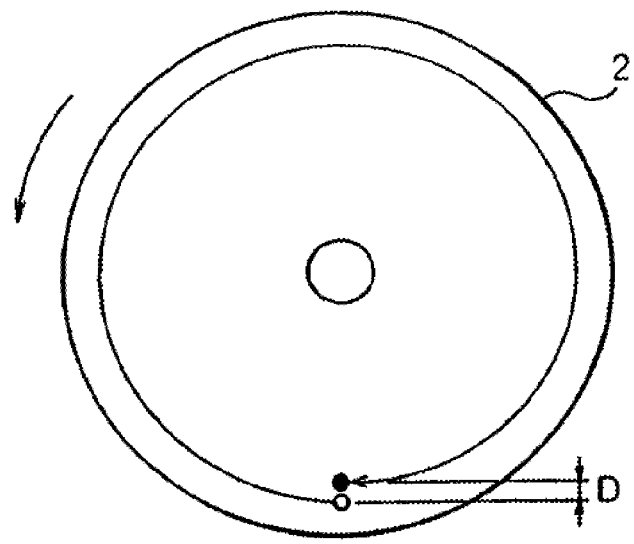
Figure 7B:
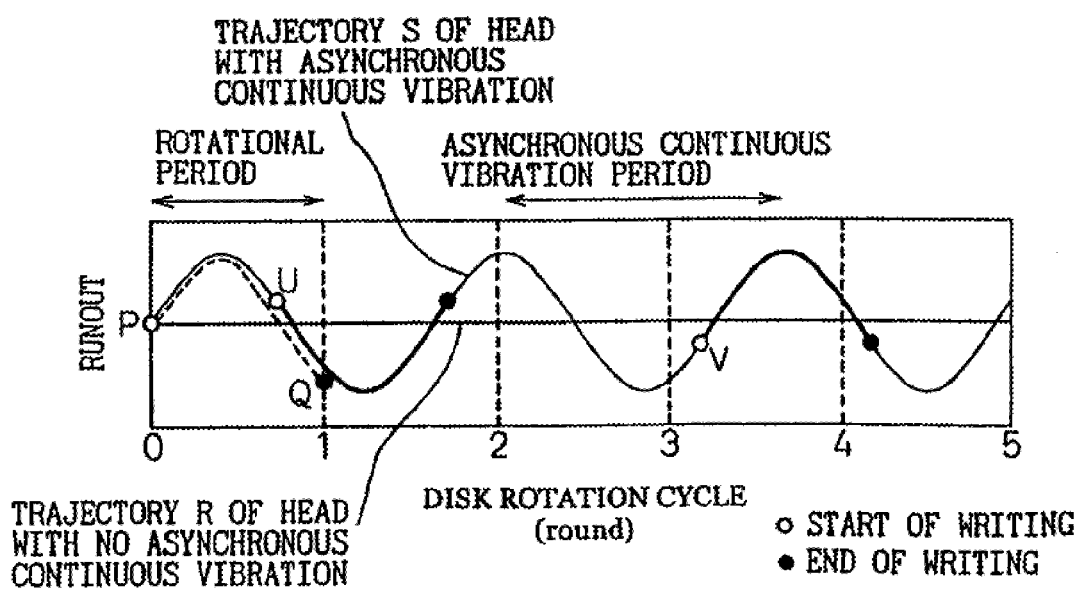

The optical clock head 19 is arranged, like in the fifth embodiment, at a place where the signal can be written, other than the zone where the STW is carried out with the head 6 in the disk file apparatus and the zone where the reference head 9 is used. The optical clock head 19, as disclosed in Japanese Unexamined Patent Publication No. 5-303852, can perform the function of the clock head 9 used in the conventional STW at the same time. When using the optical clock head 19 without using the reference head 9, therefore, the optical clock head 19 is arranged at a place where the reference head 9 described with reference to FIG. 13 would otherwise might be located as shown in FIG. 14.

According to the sixth embodiment, the servo signal for focus control due to the optical clock head 19 is used for detection of an axial runout thereby to detect the asynchronous continuous vibration fc. While observing this signal, the STW is carried out. The method of carrying out the STW can be exactly the same as in the fifth embodiment.

[Seventh Embodiment]

In the first to sixth embodiments described above, the phase of the asynchronous continuous vibration fc out of phase with the rotation of the spindle motor is detected, and the write starting point on the servo track is determined in such a manner that no misalignment is caused between the write starting point and the write ending point on the servo track of the disk medium. In the seventh embodiment, on the other hand, the asynchronous continuous vibration is detected by use of the detecting means as in the first to sixth embodiments, but the difference lies in that the vibration offsetting the detected asynchronous continuous vibration fc is applied to the carriage for carrying out the STW. In other words, according to the seventh embodiment, the STW is carried out by suppressing the asynchronous continuous vibration fc in synchronism with the same vibration.

Thus, the means for detecting the asynchronous continuous vibration fc may be any one of the accelerometer, the displacement gauge, the head in the disk file apparatus, the reference head, or the third type of head. The means for driving the head for carrying out the STW in synchronism with the asynchronous continuous vibration fc at a frequency 180° different from the phase of the asynchronous continuous vibration fc can be a drive mechanism for the positioning pin of the servo track writer 30 described with reference to FIG. 6 or a head inching mechanism arranged on the load beam located between the head and the carriage of the disk file apparatus. The present applicant has already filed a patent application for an inching mechanism comprising a piezoelectric element mounted on a load beam which is expanded and contracted according to the magnitude of the voltage applied to the piezoelectric element so that the head can be moved finely without regard to the operation of the carriage operation.

In the seventh embodiment, the first step is to read the head position signal in accordance with the conventional STW process thereby to measure the phase and amplitude of the asynchronous continuous vibration fc written as a head position signal. If m is the number of servo sectors, fr the rotational frequency of the spindle motor, fc the bearing frequency, and n(i) the number of the servo sector where the ith servo track begins to be written then, the STW substantially meeting the conditions of the following equation is carried out by adjacent servo track. In the equation, "mod" means an operator capable of producing the solution of the remainder for the succeeding numerical value m.

$$n(i)=(n(i-1)+mfr/fc) \bmod m$$

In the case of the detecting means that can observe the asynchronous continuous vibration fc constantly during the STW operation, i.e. the accelerometer, the displacement gauge or the third type of head not doubling as the STW clock head, the timing of vibrating the actuator for moving the head during the STW operation is calculated by adjusting the amplitude and phase in such a manner as to suppress the amplitude of write operation in synchronism with the asynchronous continuous vibration of the detected output, taking into account the phase difference between the position signal output from the head and the asynchronous continuous vibration fc of the detection output from the detecting means. At this timing, the external actuator, such as the servo track writer 30 or the head inching mechanism inserted between the carriage and the head, is vibrated thereby to carry out the STW operation while offsetting the asynchronous continuous vibration fc.

In the case of the detecting means which does not observe the asynchronous continuous vibration constantly during the STW operation, i.e. the head of the disk file apparatus, the reference head or the third type of head doubling as the reference head, as explained in the third embodiment, the amplitude and phase of the vibration are adjusted in such a manner as to suppress the asynchronous continuous vibration fc written by STW with a given index signal as a reference time point, and the STW is carried out while offsetting the asynchronous continuous vibration fc by vibrating an external actuator like the servo track writer 30 or a head inching mechanism interposed between the carriage and the head.

The foregoing description of the embodiments concerns the case in which the asynchronous continuous vibration fc is the bearing vibration of a single frequency. However, the invention is also applicable to the case where the asynchronous continuous vibration fc is a plurality of frequencies, for example, in the case of a plurality of bearing frequencies. In the case where the asynchronous continuous frequency fc is plural, the spectrum obtained by demodulating the information in the servo track first written can be used for several bearing frequencies having a large effect from the viewpoint of the frequency and amplitude. Also, the embodiments described above are applicable not only to the spindle vibration of the disk file apparatus but also to the vibration of a spindle on which the disk medium is mounted separately from the disk file apparatus for carrying out the STW.

What is claimed is:

1. A method of writing at least a servo track in recording tracks of a disk file apparatus comprising at least one disk medium rotated by a spindle motor, a head for writing and reading the data on and from said, disk medium, and at least a head moving mechanism, said disk medium having a recording surface formed with concentric recording tracks segmented into a plurality of sectors each having written therein the positioning information for said head in advance, said method comprising the steps of:

detecting continuous vibration of the medium, said continuous vibration being asynchronous with the rotational frequency of said spindle motor;

detecting the phase of the detected asynchronous continuous vibration;

determining the write start sector or the write end sector or the write start time or the write end time of each servo track based only on said detected phase of the asynchronous continuous vibration; and moving said head by said head moving mechanism on said recording surface where said head positioning information is to be written and writing said information based on said write start sector or said write end sector, the method further comprising the steps of:

detecting the rotational frequency of said spindle motor;

writing the head positioning information for a predetermined number of tracks in advance on said disk medium by the conventional servo track write method;

detecting the phase of the head position signal output by reading, using the same head, said predetermined number of the tracks having written therein said head positioning information; and measuring the phase difference between the phase of said head position signal output and the phase of said asynchronous continuous vibration;

wherein said step of determining the write start sector or the write end sector includes the substep of setting a servo track write start position $[(1-fc/fr) \times 180]°$ behind the phase of the peak amplitude of said asynchronous continuous vibration in the case where fc<fr, and a servo track write start position $[(fc/fr-1) \times 180]°$ ahead of the phase of the peak amplitude of said asynchronous continuous vibration in the case where fc>fr, where fc is the frequency of said asynchronous continuous vibration and fr is the rotational frequency of said spindle motor.

2. A method of writing a servo track for a disk file apparatus according to claim 1, further comprising the steps of:

reading, using the same head, said predetermined number of the tracks having written therein said head positioning information;

wherein said step of detecting the continuous vibration asynchronous with the rotational frequency of said spindle motor includes the substep of detecting the phase of said head position signal thereby to detect said asynchronous continuous vibration; and wherein said step of writing said information in said servo track includes the substeps of forming a schedule for writing information in plural ones of all the recording tracks and writing the head positioning information in said plural servo tracks in accordance with said schedule.

3. A method of writing a servo track for a disk file apparatus according to claim 2, further comprising the steps of:

detecting the phase difference between the phase detected in said step of detecting the phase of said head position signal output and the phase detected at the time of forming the preceding schedule; and repeating the steps including and subsequent to said step of writing the head positioning information for a predetermined number of tracks in advance in said disk medium by the conventional servo track write method in the case where said phase difference exceeds a predetermined value.

4. A method of writing a servo track for a disk file apparatus according to claim 1, further comprising the steps of:

moving a reference head finely after writing therein said clock signal at the outermost peripheral portion;

wherein said step of detecting the continuous vibration asynchronous with the rotational frequency of said spindle motor includes the substeps of observing the modulation of said clock signal detected from said reference head and detecting the phase of said asynchronous continuous vibration from said observed modulation; and wherein said step of writing said information includes the substeps of forming a schedule for writing information in plural ones of all the recording tracks and writing the head positioning information in accordance with said schedule.

5. A method of writing a servo track for a disk file apparatus according to claim 1, further comprising the steps of:

writing the head positioning information for at least one track by a third head other than said head and said head for writing said reference signal, at a place other than the zone of said disk medium for carrying out the servo track write operation and the zone where said reference signal is written; and reading said track having written therein said head positioning information, by means of said third head;

wherein said step of determining the asynchronous continuous vibration of the rotational frequency of said spindle motor includes the substep of detecting said asynchronous continuous vibration by detecting the phase of the head position signal read by said third head.

6. A method of writing a servo track for a disk file apparatus according to claim 1, wherein said continuous asynchronous vibration is detected with a displacement gauge.

* * * * *

UNITED STATES PATENT AND TRADEMARK OFFICE
CERTIFICATE OF CORRECTION

PATENT NO.       : 6,904,010 B1
APPLICATION NO.  : 09/512500
DATED            : June 7, 2005
INVENTOR(S)      : Kuroba et al.

It is certified that error appears in the above-identified patent and that said Letters Patent is hereby corrected as shown below:

<u>In the Drawings</u>:

Figs. 3A, 7B, 11A and 11B, delete "SPINDLE SPEED" and insert --DISK ROTATION CYCLE--.

As shown in the attached sheets

Signed and Sealed this

Sixth Day of May, 2008

JON W. DUDAS
*Director of the United States Patent and Trademark Office*

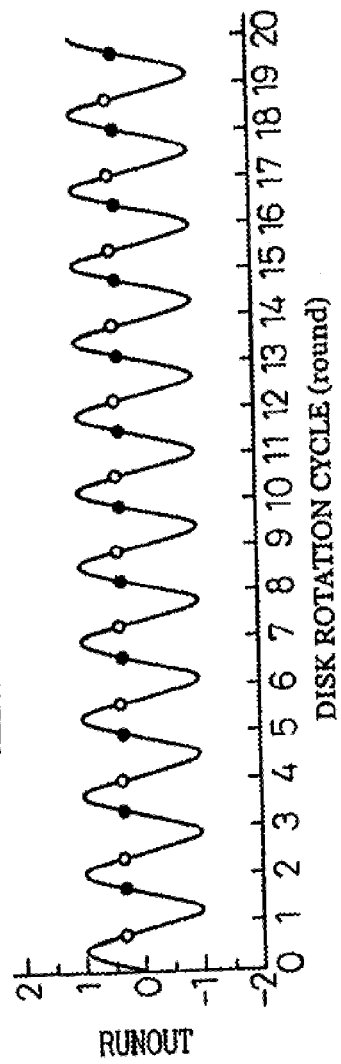
Fig.11A ALLOWABLE PHASE ANGLE ±2°
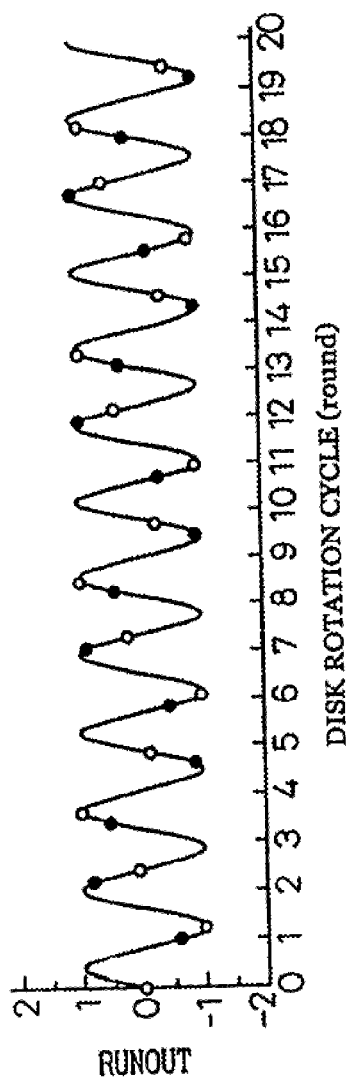
Fig.11B PRIOR ART ALLOWABLE PHASE ANGLE ±90°